W. C. GRIMES.
Hulling Machine.
No. 52,706.
Patented Feb. 20, 1866.
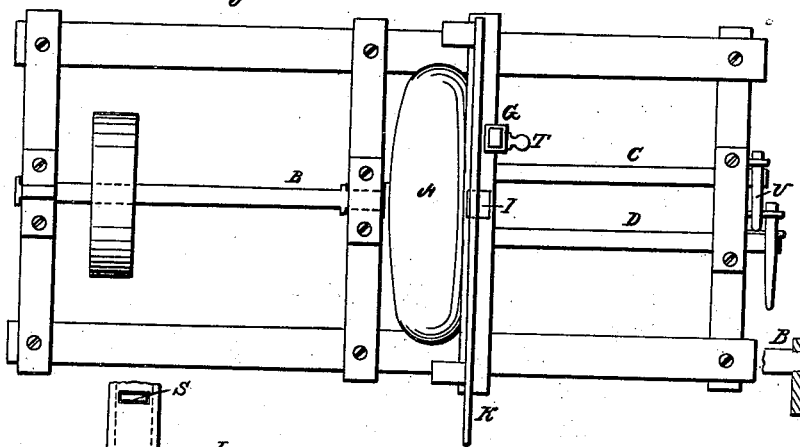
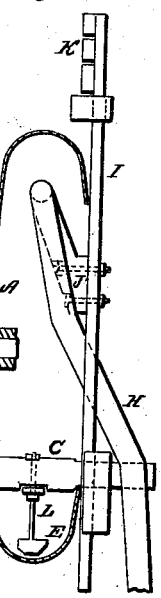
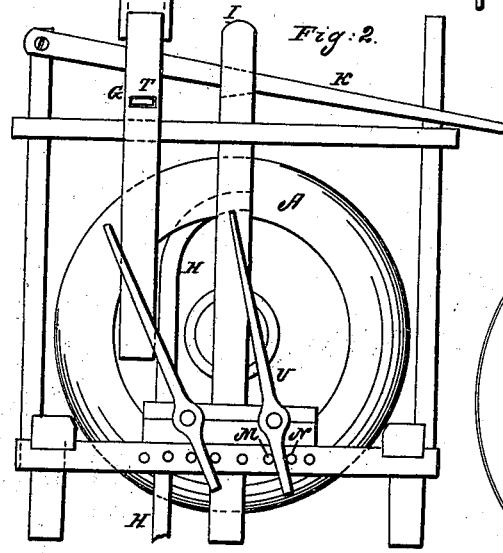
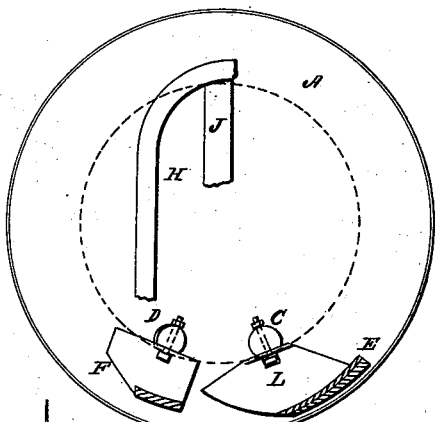
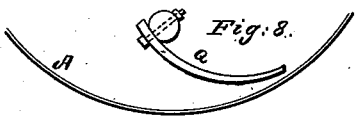
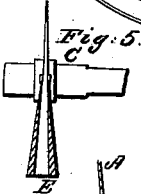
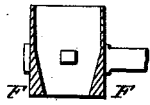
Witnesses:
Inventor:
Wm. C. Grimes.

UNITED STATES PATENT OFFICE.

WILLIAM C. GRIMES, OF PHILADELPHIA, PENNSYLVANIA.

IMPROVEMENT IN GRAIN-HULLERS.

Specification forming part of Letters Patent No. 52,706, dated February 20, 1866.

*To all whom it may concern:*

Be it known that I, WILLIAM C. GRIMES, of Philadelphia, in the county of Philadelphia and State of Pennsylvania, have invented a new and useful Machine for Hulling and Scouring Corn or other Grain; and I do hereby declare that the following is a full and exact description thereof, reference being had to the accompanying drawings, and to the letters of reference marked thereon.

The nature of my invention consists in hulling corn or other grain by means of a fixed or adjustable plow (so called) hung within an oblate spheroidal or other similarly-formed shell, which rapidly revolves, and thus holds the corn to its interior surface by centrifugal force, while the plow hangs within the space occupied by the revolving grain, so that a severe attrition takes place between it and the roughened or serrated surface of the plow, removing the hull, germ, &c.

Figure 1 is a top view of the machine. Fig. 2 is a front elevation of the same. Fig. 3 is a transverse section of the shell and internal parts. Fig. 4 is a longitudinal section of the shell and internal parts. Figs. 5 and 6 are plows E and F, as seen from below. Fig. 7 is a rear view of the same plows E F. Fig. 8 is another form of plow.

The shell A, which is of cast-iron, is fixed upon a strong shaft, B, and overhangs its bearings. A large circular and central portion of one side of the shell is removed to admit the shafts C and D, that hold the plows E and F F; also for the entrance and exit of the grain, through the grain, through the tubes G and H. The former conveys the corn or grain from the bin or garner to the shell and is stationary, while the latter discharges the hulled grain or meal and refuse from the shell, and has for that purpose a longitudinal movement. The said tube is curved in its upper part, so that the axis of it at the orifice is nearly at right angles with the radius of the shell. Hence, when raised against the moving grain the latter is driven into it and is discharged below. This tube is firmly connected to the sliding bar I by the bracket J, and raised and lowered by the lever K.

The plow E is made of cast-iron or other hard material, and is curved and tapering in its length, its curvature corresponding with the circle of the shell, while in its transverse section it is a semi-octagon, with its sides serrated or cut into teeth. In its transverse section other forms, as round, square, or hexagonal, may be used; but it should be comparatively thick or broad at one end, while it converges nearly to a point at the other. It is connected to the semi-rotative shaft C through the medium of a thin plate, L, the plane of which coincides with the plane of rotation of the shell. Through a flange at the upper edge of the said plate or web it is bolted to the shaft C. From the relative position of the plow E and the shaft C the former may be adjusted by the lever U to the requisite proximity of the shell and there retained by the pins M and N.

The shaft D is operated and adjusted in a similar manner. It is provided or armed with two plates F and F, which lie near the opposite sides of the shell. At their lower ends they are formed with surfaces inversely inclined to the plane of rotation. These surfaces are cut or serrated, and serve as semi-plows, and also as gatherers, to throw the grain inward upon the track of the plow E, while the latter causes a constant divergence of the grain next the shell. Hence every particle of grain within the shell is, in turn, presented to the action of the plow. Where attrition among the grain only is required the plow and the inclined surfaces may be nearly smooth.

Q represents another form of plow, which is a curved and flattened quadrangular bar. This form is suited to the purpose of rubbing the grain among themselves.

The machine, which is driven by a belt and pulley, I have described as revolving vertically; but I intend to make them sometimes to revolve horizontally.

The machine operates intermittingly or by charges, the requisite quantity grain being let into the shell while in motion. It is then run a given length of time, or the required length of time, when the hulled grain with the hulls and waste is discharged therefrom by raising the tube H by lever K. Another charge is then let in, and so on.

In order that the required quantity and no more may pass into the machine with a degree of certainty, the tube G is provided with two gates, S and T, which are opened and closed alternately, the space in the tube between them holding the required quantity for a charge.

What I claim as new and as my invention, and desire to secure by Letters Patent, is—

1. The mode, as herein described, of hulling corn or other grain by means of a fixed or adjustable plow acting upon it while held by centrifugal force to the interior surface of a spheroidal or other formed shell, as hereinbefore described.

2. The combination of the revolving spheroidal or other formed shell A with the adjustable plow E, for hulling corn or other grain, as hereinbefore specified and set forth.

3. In combination, the shell A and the plates F F, to act as semi-plows or gatherers, as hereinbefore described.

4. The curved and movable tube H, in combination with the shell for discharging the hulled grain, hulls, and meal from the shell, as hereinbefore described.

WM. C. GRIMES.

Witnesses:
W. P. HIBBERD,
COFFMAN JAMES.